United States Patent
Yellin et al.

(10) Patent No.: US 11,443,132 B2
(45) Date of Patent: Sep. 13, 2022

(54) CONTINUOUSLY IMPROVE RECOGNITION OR PREDICTION ACCURACY USING A MACHINE LEARNING MODEL TO TRAIN AND MANAGE AN EDGE APPLICATION

(71) Applicant: International Business Machines Corporation, Armonk, NY (US)

(72) Inventors: Daniel M. Yellin, Raanana (IL); Girish Dhanakshirur, Bengaluru (IN)

(73) Assignee: International Business Machines Corporation, Armonk, NY (US)

(*) Notice: Subject to any disclaimer, the term of this patent is extended or adjusted under 35 U.S.C. 154(b) by 861 days.

(21) Appl. No.: 16/293,962

(22) Filed: Mar. 6, 2019

(65) Prior Publication Data

US 2020/0285891 A1    Sep. 10, 2020

(51) Int. Cl.
```
G06K 9/62      (2022.01)
H04L 67/00     (2022.01)
G06N 20/00     (2019.01)
```
(52) U.S. Cl.
CPC .......... *G06K 9/6227* (2013.01); *G06N 20/00* (2019.01); *H04L 67/34* (2013.01)

(58) Field of Classification Search
None
See application file for complete search history.

(56) References Cited

U.S. PATENT DOCUMENTS

| | | | |
|---|---|---|---|
| 9,413,779 B2* | 8/2016 | Vasseur | H04L 63/1425 |
| 9,547,828 B2 | 1/2017 | Mermoud et al. | |
| 10,754,912 B2* | 8/2020 | Novielli | G06N 20/00 |
| 2015/0332165 A1 | 11/2015 | Mermoud et al. | |
| 2017/0060574 A1 | 3/2017 | Malladi et al. | |
| 2017/0124487 A1 | 5/2017 | Szeto et al. | |
| 2018/0060759 A1* | 3/2018 | Chu | G06N 20/00 |
| 2019/0370687 A1* | 12/2019 | Pezzillo | H04L 67/10 |
| 2020/0017124 A1* | 1/2020 | Camhi | B60W 10/08 |
| 2020/0265493 A1* | 8/2020 | Kumar Addepalli | G06N 20/00 |
| 2022/0091837 A1* | 3/2022 | Chai | G06F 8/36 |

* cited by examiner

*Primary Examiner* — James A Edwards
(74) *Attorney, Agent, or Firm* — Yee & Associates, P.C.

(57) ABSTRACT

Distributing machine learning models to electronic devices is provided. A number of machine learning models are built and stored on a server, wherein each model is customized to different device and user requirements. A request for a machine learning model is received from an electronic device, wherein the request includes a device profile comprising device attributes and user characteristics. The server determines which machine learning model from among the number of models is best suited for the device profile according to a set of model policies. The machine learning model best suited for the device profile is selected and downloaded to the device.

15 Claims, 6 Drawing Sheets

```
If (EdgeType is not registered) { // this edgetype note seen before
    choose a model to deploy on this device // for instance, choose model known to be good on a similar edgetype
    Push model and monitor feedback
}
Else {
    model-A = Best model for this device in Models Policies database // returns the best model for this edgetype
    If (model-A'.score > Threshold) { // the highest scoring model is above the threshold for good performance
        Push model-A and monitor feedback
    }
    Else { // none of the models have good scores so setup A/B testing
        choose another model, model-B, to deploy on this device // for instance, choose a model known to be
                                                                // good on a similar edgetype
        Push model-B and monitor feedback
        If model-A.score > model-B.score { // model-B performed worst than model-A
            Push model-A and monitor feedback
        }
    }
}
```

FIG. 5

CONTINUOUSLY IMPROVE RECOGNITION OR PREDICTION ACCURACY USING A MACHINE LEARNING MODEL TO TRAIN AND MANAGE AN EDGE APPLICATION

BACKGROUND

The disclosure relates generally to machine learning, and more specifically to deploying machine learning models on edge devices including mobile applications.

Currently, most artificial intelligence (AI) and machine learning (ML) models, augmented reality (AR), and similar types of models are created and run on a server. The models are trained from a data-set using algorithms such as linear regression, convolutional neural networks (CNN), and similar algorithms to fit the models.

Tools such as IBM Watson® Studio facilitate building such models and hosting these models in a microservice that be accessed via application programming interfaces (APIs). Users can invoke APIs on a server to make use of such models. For example, if the model classifies objects in a picture on a smartphone, the smartphone will send the picture to the server, and the servers will run the model and classify the objects in the picture. The results are then sent back to the smartphone.

There is an emerging capability to create ML and other models on a server and then run the model on a remote device such as a smartphone, Internet of Things (IoT) gateway, or some other end-point device. This emerging capability is driven by factors such as the latency of invoking the model on the server, privacy issues, and support for devices disconnected from the Internet.

SUMMARY

An illustrative embodiment provides method of distributing machine learning models to electronic devices. The method comprises building, by an artificial intelligence system, a number of machine learning models and storing the models on a server, wherein each model is customized to different device and user requirements. The server receives a request for a machine learning model from an electronic device, wherein the request includes a device profile comprising device attributes and user characteristics. The server determines which of the machine learning models is best suited for the device profile according to a set of model policies. The machine learning model best suited for the device profile is selected from among the number of models and downloaded to the electronic device.

Another illustrative embodiment provides a system for distributing machine learning models to electronic devices. The system comprises a bus system, a storage device connected to the bus system, wherein the storage device stores program instructions, and a number of processors connected to the bus system, wherein the number of processors execute the program instructions to: build a number of machine learning models and storing the models on a server, wherein each model is customized to different device and user requirements; receive a request for a machine learning model from an electronic device, wherein the request includes a device profile comprising device attributes and user characteristics; determine which machine learning model from among the number of models is best suited device profile according to a set of model policies; select the machine learning model best suited for the device profile; and download the selected machine learning model to the electronic device.

Another illustrative embodiment provides a computer program product for distributing machine learning models to electronic devices. The computer program product comprising a non-volatile computer readable storage medium having program instructions embodied therewith, the program instructions executable by a number of processors to cause the computer to perform the steps of: building a number of machine learning models and storing the models on a server, wherein each model is customized to different device and user requirements; receiving a request for a machine learning model from an electronic device, wherein the request includes a device profile comprising device attributes and user characteristics; determining which machine learning model from among the number of models is best suited device profile according to a set of model policies; selecting the machine learning model best suited for the device profile; and downloading the selected machine learning model to the electronic device.

BRIEF DESCRIPTION OF THE DRAWINGS

FIG. 5 illustrates an algorithm for determining appropriate machine learning model to deploy on an edge device in accordance with an illustrative embodiment;

DETAILED DESCRIPTION

Figure 1:
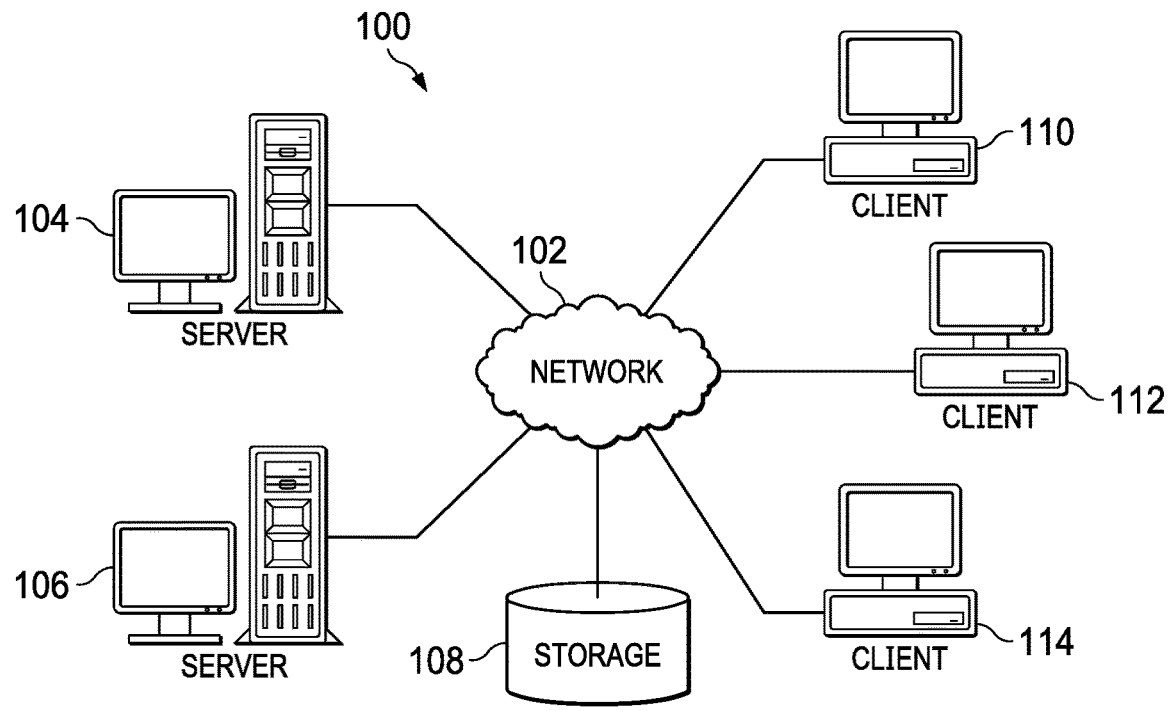
FIG. 1 depicts a pictorial representation of a network of data processing systems in which illustrative embodiments can be implemented.

Illustrative embodiments recognize and take into account that multiple ML models might exist to accomplish a similar task, but each model is customized for specific device properties. For example, there might be a higher fidelity model and a lower fidelity model, wherein the former model requires more storage than the latter. Embodiments can determine which of these models should be deployed on a device depending on the device's storage capacity, camera quality, and other related technical features. Illustrative embodiments can also determine if an ML model requires certain prerequisites to be installed and choose a different model if those prerequisites are not present on a device.

Embodiments recognize and take into account that different ML models might be more appropriate for different users, depending on user characteristics. For example, a model for fitness training might depend on the age and health of the end-user. The device itself will not necessarily know which device/user combination should receive which model. Illustrative embodiments are able to discover through operational experience which models are best suite for specific device/user combinations.

The illustrative embodiments provide a method for having a server deploy ML models to edge devices according to model distribution policies. Each version of a model has a policy that specifies the preferred device (or device properties) and user characteristics for that specific version of the model. Each device gathers a device and user profile that determines which ML model the device receives from the server.

The device continually gathers new information to keep the profile up to date. Whenever the device connects to the servers, the servers will check if new versions of the models are available and will match the up-to-date device/user profile against the model policies to determine the best model to deploy on the device according to device and user characteristics.

In an illustrative embodiment, the device gathers data on the performance of the model deployed on the device, both in terms of the execution characteristics and model accuracy. This performance data is uploaded to the servers, which uses this information to improve the model and the model distribution policies themselves.

As used herein, the phrase "a number" means one or more. The phrase "at least one of", when used with a list of items, means different combinations of one or more of the listed items may be used, and only one of each item in the list may be needed. In other words, "at least one of" means any combination and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

FIG. 1 depicts a pictorial representation of a network of data processing systems in which illustrative embodiments can be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more connector services for managing idempotent operations on a system of record, such as storage 108. An idempotent operation is an identical operation, which was previously performed or executed, that has the same effect as performing a single operation. Also, it should be noted that server 104 and server 106 may each represent a plurality of servers providing management of idempotent operations for a plurality of system of records.

Client 110, client 112, and client 114 also connect to network 102. Clients 110, 112, and 114 are clients of server 104 and server 106. Server 104 and server 106 may provide information, such as boot files, operating system images, and software applications to clients 110, 112, and 114.

In this example, clients 110, 112, and 114 are shown as desktop or personal computers. However, it should be noted that clients 110, 112, and 114 are intended as examples only. In other words, clients 110, 112, and 114 may include other types of data processing systems, such as, for example, network computers, laptop computers, tablet computers, handheld computers, smart phones, smart watches, personal digital assistants, gaming devices, set-top boxes, kiosks, and the like. Users of clients 110, 112, and 114 may utilize clients 110, 112, and 114 to access system of records corresponding to one or more enterprises, via the connector services provided by server 104 and server 106, to perform different data operations. The operations may be, for example, retrieve data, update data, delete data, store data, and the like, on the system of records.

Storage 108 is a network storage device capable of storing any type of data in a structured format or an unstructured format. In addition, storage 108 may represent a plurality of network storage devices. Further, storage 108 may represent a system of record, which is an authoritative data source, corresponding to an enterprise, organization, institution, agency, or similar entity. Furthermore, storage unit 108 may store other types of data, such as authentication or credential data that may include user names, passwords, and biometric data associated with client users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

There are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforcement learning methods learn from interactions with an environment. Algorithms such as Q-learning are used to train the predictive model through interacting with the environment using measurable performance criteria.

Figure 2:
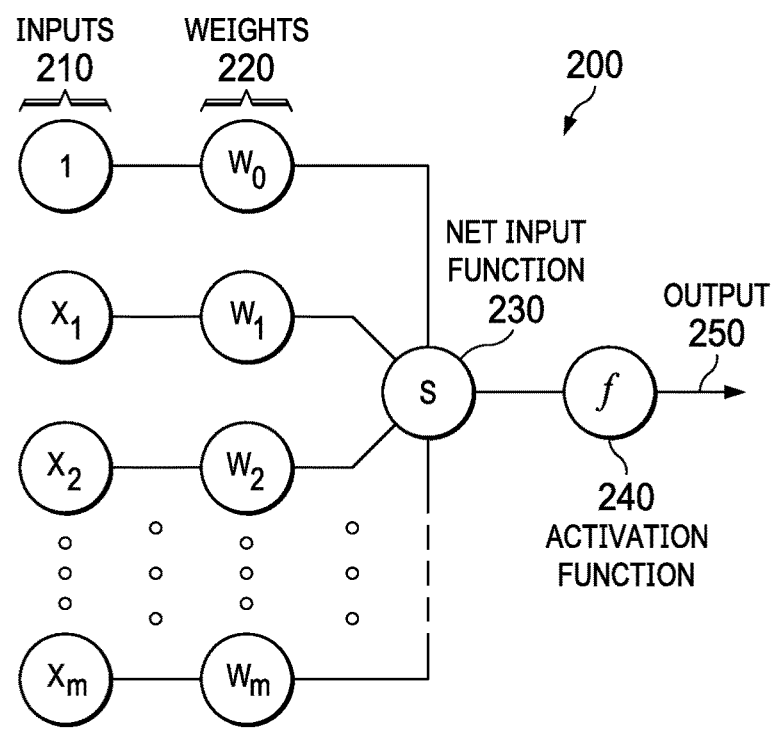
FIG. 2 is a diagram that illustrates a node in a neural network in which illustrative embodiments can be implemented.

FIG. 2 is a diagram that illustrates a node in a neural network in which illustrative embodiments can be implemented. Node 200 combines multiple inputs 210 from other nodes. Each input 210 is multiplied by a respective weight 220 that either amplifies or dampens that input, thereby assigning significance to each input for the task the algorithm is trying to learn. The weighted inputs are collected by a net input function 230 and then passed through an activation function 240 to determine the output 250. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Stochastic neural networks are a type of network that incorporate random variables, which makes them well suited for optimization problems. This is done by giving the nodes in the network stochastic (randomly determined) weights or transfer functions. A Boltzmann machine is a type of stochastic neural network in which each node is binary valued, and the chance of it firing depends on the other nodes in the network. Each node is a locus of computation that processes an input and begins by making stochastic decisions about whether to transmit that input or not. The weights (coefficients) that modify inputs are randomly initialized.

In machine learning, a cost function estimates how the model is performing. It is a measure of how wrong the model is in terms of its ability to estimate the relationship between input x and output y. This is expressed as a difference or distance between the predicted value and the actual value. The cost function (i.e. loss or error) can be estimated by iteratively running the model to compare estimated predictions against known values of y during supervised learning. The objective of a machine learning model, therefore, is to find parameters, weights, or a structure that minimizes the cost function.

Gradient descent is an optimization algorithm that attempts to find a local or global minima of a function, thereby enabling the model to learn the gradient or direction that the model should take in order to reduce errors. As the model iterates, it gradually converges towards a minimum where further tweaks to the parameters produce little or zero changes in the loss. At this point the model has optimized the weights such that they minimize the cost function.

Neural networks can be stacked to created deep networks. After training one neural net, the activities of its hidden nodes can be used as training data for a higher level, thereby allowing stacking of neural networks. Such stacking makes it possible to efficiently train several layers of hidden nodes. Examples of stacked networks include deep belief networks (DBN), deep Boltzmann machines (DBM), convolutional neural networks (CNN), recurrent neural networks (RNN), and spiking neural networks (SNN).

Figure 3:
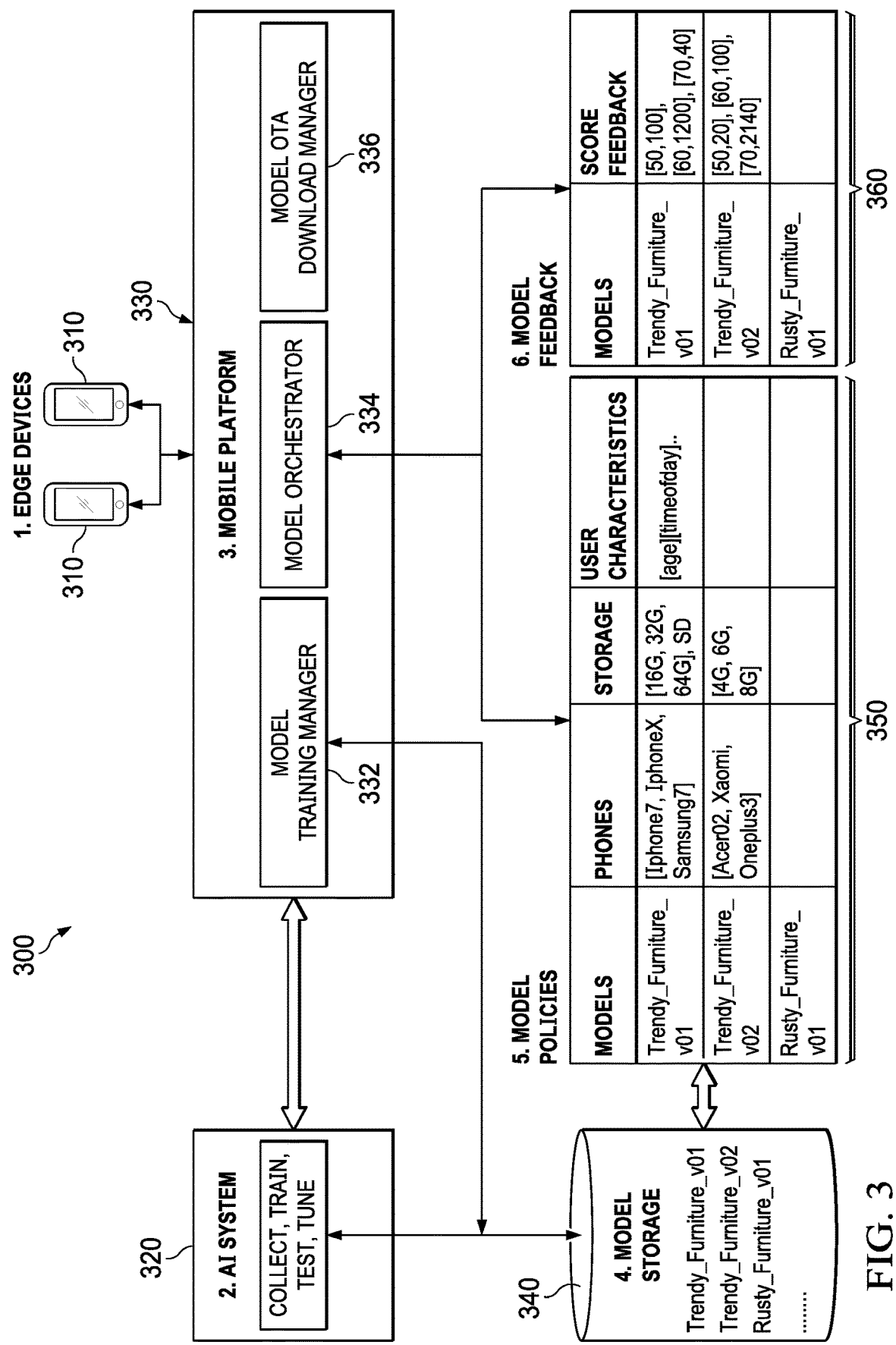
FIG. 3 illustrates a machine learning model distribution system in accordance with an illustrative embodiment.

FIG. 3 illustrates a machine learning model distribution system in accordance with an illustrative embodiment. The system 300 is configured to deploy and update ML models on edges devices 310. The edge device can be mobile phones, smart devices, tablet computers, and other IoT devices capable of performing AI functions.

The AI System 320 can be a tool used to collect data, define functions, and train, test and tune ML models based on the collected data and functions. Model Storage 340 is a large storage system that securely holds all model files created and updated by the AI System 320.

Mobile Platform 330 is a middleware or cloud service that performs backend operations for edge devices 310. This platform also checks the version of ML models installed on the edge devices 310 and collects various data points used in computing data sets for training the ML models.

The mobile platform 330 can comprise several components. Model Training Manager 332 is a software component that continuously collects training data sets and triggers the AI System 320 to train and build new models. Model Orchestrator 334 picks the best ML model for each edge device 310 depending on the model policies 350. Model Over-the-Air (OTA) Download Manager 336 handles pushing new delta models to the edge devices 310. Download Manager 336 also securely signs the updated model so that the client device knows it comes from a trusted source.

Model Policies 350 comprise a database table that holds information for each ML model cross-matched with known edge device types, device properties, and user characteristics. A device profile or Edge Type is a combination of both device and user characteristics, which can be expressed as a tuple <Dev Class, User Class>, where Dev Class indicates the class of device, including device attributes, and User Class indicates the type of user using the device.

The Models Policies database 350 indicates for which Edge Type an ML model is known to perform well. More precisely, it associates a score for how well a model performs for an Edge Type. For example, in one instantiation the score consists of tuples of the form <Mod, ET, S>, indicating that the model version Mod running on devices of Edge Type ET have a score S. If there exists at least one tuple for Edge Type ET in the Model Policies database 350, then ET is registered. Otherwise it is not registered.

Model Feedback 360 comprises a database table that holds feedback information received from edges device 310 regarding the accuracy of deployed ML models.

Figure 4:
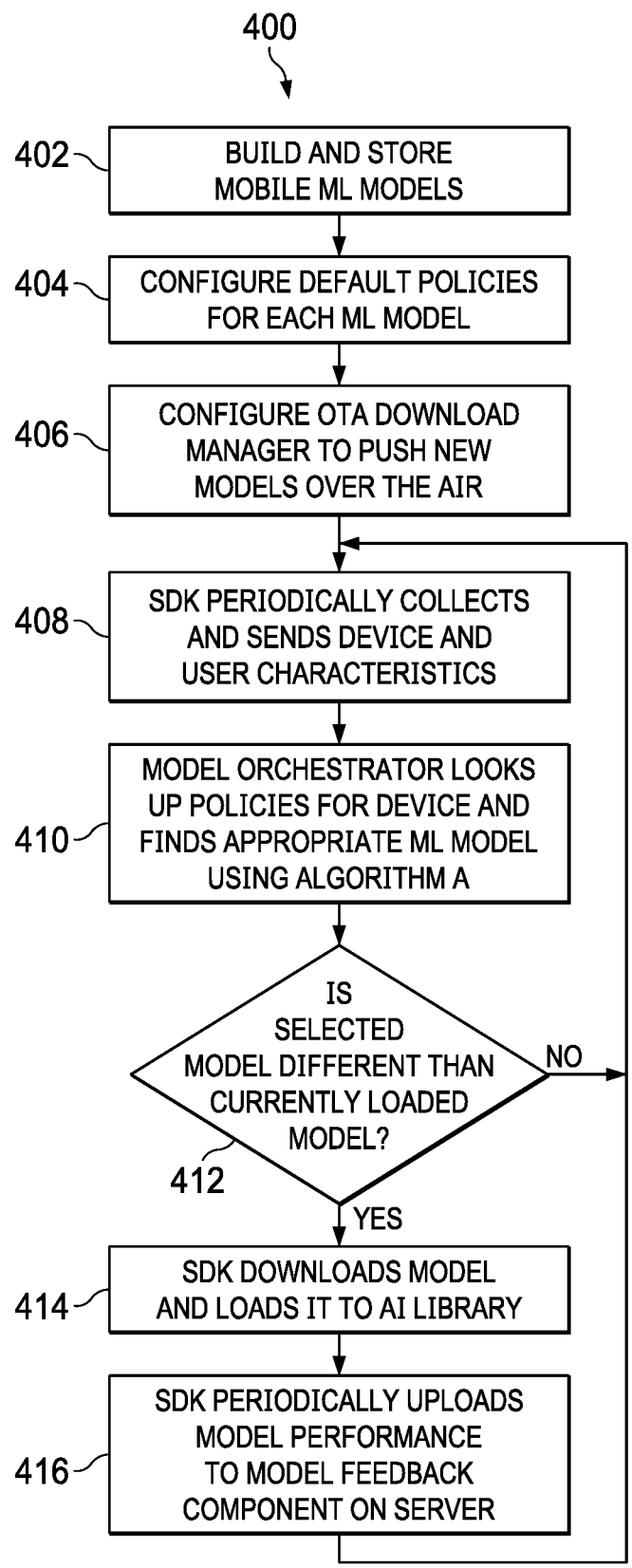
FIG. 4 illustrates a process flow for managing versions of machine learning models deployed on edge devices in accordance with an illustrative embodiment.

FIG. 4 illustrates a process flow for managing versions of machine learning models deployed on edge devices in accordance with an illustrative embodiment. Process 400 begins with data scientists and engineers use the AI System 320 tool to build mobile ML models, which are stored in Model Storage 340 (step 402).

A mobile developer uses the Mobile Platform 330 to configure default Model Policies 350 for each ML model in Model Storage 340 (step 404). The mobile developer then configures the Model OTA Download Manager 336 to push new model files over the air when new models are built (step 406).

The software development kit (SDK) running on the edge device 310 periodically collects and sends device and user characteristics to update the device profile (Edge Type) (step 408). The Mobile Orchestrator 334 looks up policies for that edge device and determines the optimum ML model to deploy on the device using A/B testing (step 410). A/B testing involves testing two or more models at random and using statistical analysis to determine which variant performs better. For example, the Mobile Orchestrator can use the steps outlined in Algorithm A shown in FIG. 5.

The Model Orchestrator 334 determine if the ML model selected in step 410 is different than the model currently loaded on the edge device 310 (step 412). If the selected ML is already loaded on the device, process 400 returns to step 408 and continues updating device data. If the ML model selected in step 410 is different from the model currently loaded on the device, the SDK downloads the model and loads it into the AI library (step 414).

Thereafter, the SDK periodically uploads model performance to the Model Feedback component 360 on the server (step 416), and process 400 continues periodic updates of device data in step 408.

The process flow illustrated in FIG. 4 depicts a method used to match the optimal ML model to a given edge device/user profile according to model policies and update the model in response to performance feedback. However, the model policies themselves can also be updated and refined in response to feedback from the edge devices. Instead of merely updating and refining a given model for deployment on a family of device types, the continual feedback from the edge devices might indicate that a different ML model altogether is better suite for that device type.

Figure 6:
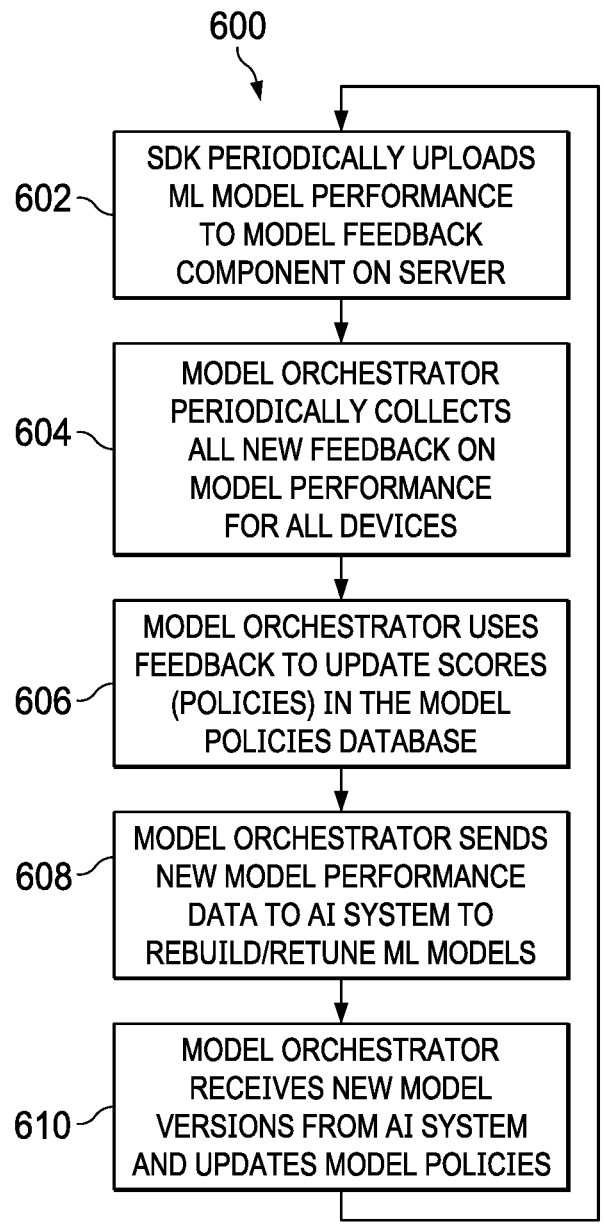
FIG. 6 illustrates a process flow for updating model distribution policies in accordance with an illustrative embodiment.

FIG. 6 illustrates a process flow for updating model distribution policies in accordance with an illustrative embodiment. In process 600 the SDK of edge device 310 periodically uploads ML model performance to the Model Feedback component 360 on the server (step 602). The Model Orchestrator 334 periodically collects all new feedback on mode performance for all devices (step 604). The Model Orchestrator 334 performs AB testing on the feedback data to update scores (policies) in the Model Policies database 350 (step 606).

Upon performing the AI function on the edge device (e.g., image recognition using the downloaded ML model), the performance data regarding the recognition results (accurate/inaccurate) is sent to the Model Orchestrator 334, which sends the new ML model performance data to the AI System 320 to rebuild and retune the ML models (step 608). The Model Orchestrator 334 then receives new ML model versions from the AI System 320 and updates the Model Policies database 350 (step 610). Process 600 continues with periodic performance updates in step 602.

Figure 7:
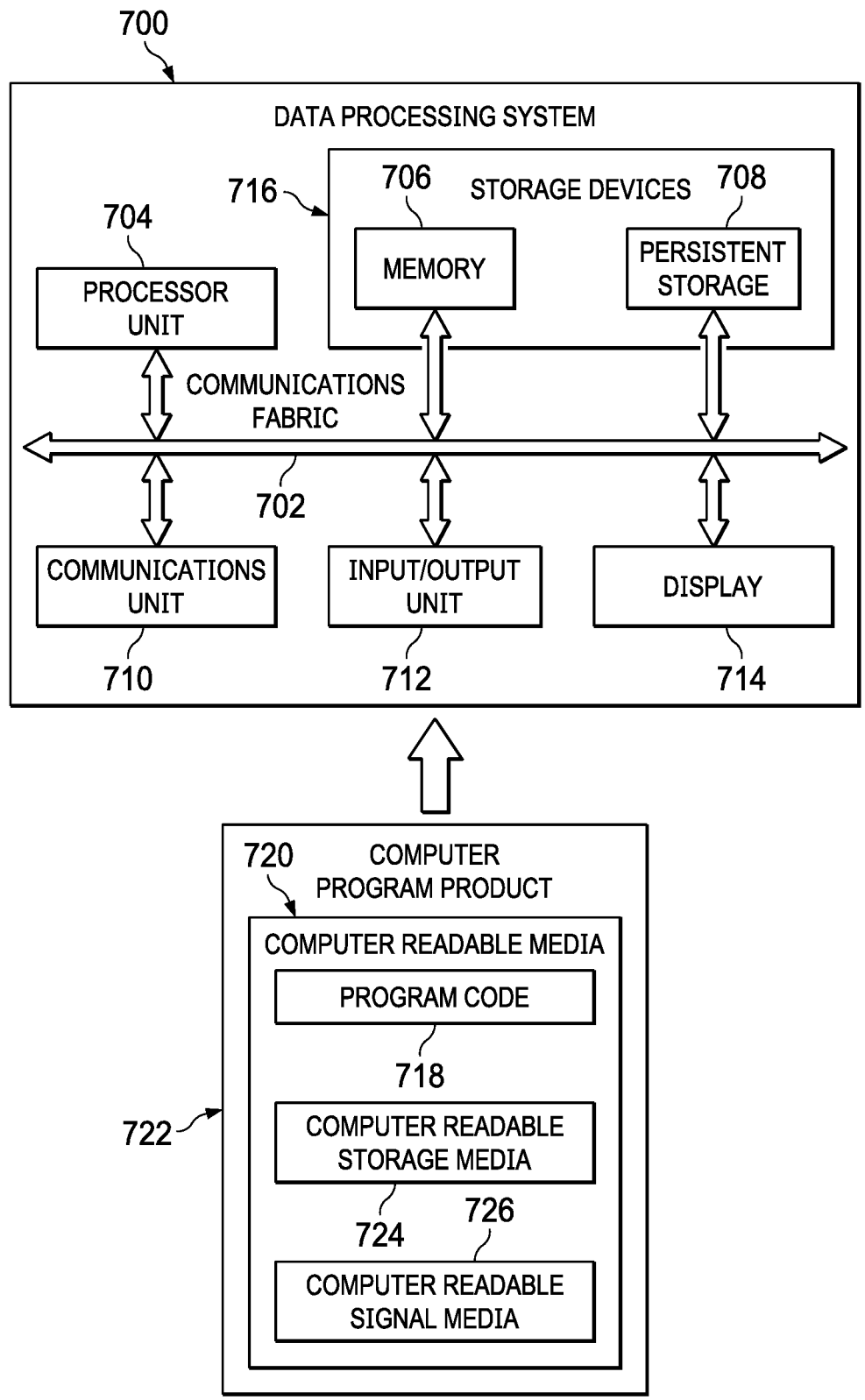
FIG. 7 is a diagram of a data processing system is depicted in accordance with an illustrative embodiment.

Turning to FIG. 7, a diagram of a data processing system is depicted in accordance with an illustrative embodiment. Data processing system 700 is an example of a system in which computer-readable program code or program instructions implementing processes of illustrative embodiments may be run. Data processing system 700 may be an example of one system in which root cause analysis system 116 in FIG. 1 may be implemented. In this illustrative example, data processing system 700 includes communications fabric 702, which provides communications between processor unit 704, memory 706, persistent storage 708, communications unit 710, input/output unit 712, and display 714.

Processor unit 704 serves to execute instructions for software applications and programs that may be loaded into memory 706. Processor unit 704 may be a set of one or more hardware processor devices or may be a multi-processor core, depending on the particular implementation. Further, processor unit 704 may be implemented using one or more heterogeneous processor systems, in which a main processor is present with secondary processors on a single chip. As another illustrative example, processor unit 704 may be a symmetric multi-processor system containing multiple processors of the same type.

A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 706, in these examples, may be, for example, a random access memory, or any other suitable volatile or non-volatile storage device. Persistent storage 708 may take various forms, depending on the particular implementation. For example, persistent storage 708 may contain one or more devices. For example, persistent storage 708 may be a hard drive, a flash memory, a rewritable optical disk, a rewritable magnetic tape, or some combination of the above. The media used by persistent storage 708 may be removable. For example, a removable hard drive may be used for persistent storage 708.

Communications unit 710, in this example, provides for communication with other computers, data processing systems, and devices via network communications unit 710 may provide communications using both physical and wireless communications links. The physical communications link may utilize, for example, a wire, cable, universal serial bus, or any other physical technology to establish a physical communications link for data processing system 700. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 700.

Input/output unit 712 allows for the input and output of data with other devices that may be connected to data processing system 700. For example, input/output unit 712 may provide a connection for user input through a keypad, keyboard, and/or some other suitable input device. Display 714 provides a mechanism to display information to a user and may include touch screen capabilities to allow the user to make on-screen selections through user interfaces or input data, for example.

Instructions for the operating system, applications, and/or programs may be located in storage devices 716, which are in communication with processor unit 704 through communications fabric 702. In this illustrative example, the instructions are in a functional form on persistent storage 708. These instructions may be loaded into memory 706 for running by processor unit 704. The processes of the different embodiments may be performed by processor unit 704 using computer-implemented program instructions, which may be located in a memory, such as memory 706. These program instructions are referred to as program code, computer-usable program code, or computer-readable program code that may be read and run by a processor in processor unit 704. The program code, in the different embodiments, may be embodied on different physical computer-readable storage devices, such as memory 706 or persistent storage 708.

Program code 718 is located in a functional form on computer-readable media 720 that is selectively removable and may be loaded onto or transferred to data processing system 700 for running by processor unit 704. Program code 718 and computer-readable media 720 form computer program product 722. In one example, computer-readable media 720 may be computer-readable storage media 724 or computer-readable signal media 726. Computer-readable storage media 724 may include, for example, an optical or magnetic disc that is inserted or placed into a drive or other device that is part of persistent storage 708 for transfer onto a storage device, such as a hard drive, that is part of persistent storage 708. Computer-readable storage media 724 also may take the form of a persistent storage, such as a hard drive, a thumb drive, or a flash memory that is connected to data processing system 700. In some instances, computer-readable storage media 724 may not be removable from data processing system 700.

Alternatively, program code 718 may be transferred to data processing system 700 using computer-readable signal media 726. Computer-readable signal media 726 may be, for example, a propagated data signal containing program code 718. For example, computer-readable signal media 726 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 718 may be downloaded over a network to persistent storage 708 from another device or data processing system through computer-readable signal media 726 for use within data processing system 700. For instance, program code stored in a computer-readable storage media in a data processing system may be downloaded over a network from the data processing system to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to, or in place of, those illustrated for data processing system 700. Other components shown in FIG. 7 can be varied from the illustrative examples shown. The different embodiments may be implemented using any hardware device or system capable of executing program code. As one example, data processing system 700 may include organic components integrated with inorganic components and/or may be comprised entirely of organic components excluding a human being. For example, a storage device may be comprised of an organic semiconductor.

As another example, a computer-readable storage device in data processing system 700 is any hardware apparatus that may store data. Memory 706, persistent storage 708, and computer-readable storage media 724 are examples of physical storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706 or a cache such as found in an interface and memory controller hub that may be present in communications fabric 702.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer readable program instructions to personalize the electronic circuitry, in order to perform aspects of the present invention.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Furthermore, it should be understood that embodiments discussed herein are not limited to the particular features and processing steps shown. The flowchart and diagrams in the figures illustrate the method and resulting architecture according to embodiments of the present disclosure. In this regard, each block in the flowchart or structural diagrams may represent a step or partial step, which comprise one or more procedures for implementing the illustrative embodiments. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of distributing machine learning models to edge devices, the method comprising:
building, by a server, a number of machine learning models and storing the number of machine learning models on the server, wherein the server customizes each respective machine learning model to a specific edge device and user combination;
receiving, by the server, a request for a machine learning model from an edge device corresponding to a user, wherein the request includes attributes of the edge device and characteristics of the user of the edge device;
determining, by the server, the specific edge device and user combination based on the attributes of the edge device and the characteristics of the user of the edge device included in the request;
selecting, by the server, the machine learning model from among the number of machine learning models that is best suited for the specific edge device and user combination according to a set of model distribution policies;
signing, by the server, the machine learning model securely to enable the edge device to know that the machine learning model is from a trusted source;
downloading, by the server, the machine learning model to the edge device; and further comprising, each time the edge device connects with the server:
updating, by the server, a device profile according to new data received from the edge device in response to the edge device performing an artificial intelligence function using the machine learning model downloaded to the edge device;
comparing, by the server, the device profile to the set of model distribution policies;
determining, by the server, whether a new machine learning model is better suited for the edge device based on comparing the device profile to the set of model distribution policies; and
responsive to the server determining that a new machine learning model is better suited for the edge device based on comparing the device profile to the set of model distribution policies, downloading, by the server, the new machine learning model to the edge device.

2. The method of claim 1, wherein the server uses A/B testing to determine the machine learning model best suited to run on the edge device.

3. The method of claim 1, wherein the set of model distribution policies match each respective machine learning model of the number of machine learning models to specific edge device attributes and user characteristics.

4. The method of claim 1, further comprising:
receiving, by the server, performance data corresponding to the machine learning model downloaded to the edge device; and
updating, by the server, the set of model distribution policies and model accuracy according to the performance data.

5. The method of claim 4, further comprising:
retuning, by the server, the machine learning model stored on the server according to the performance data.

6. A system for distributing machine learning models to edge devices, the system comprising:
a bus system;
a storage device connected to the bus system, wherein the storage device stores program instructions; and
a number of processors connected to the bus system, wherein the number of processors execute the program instructions to:
build a number of machine learning models and store the number of machine learning models on a server, wherein the server customizes each respective machine learning model to a specific edge device and user combination;
receive a request for a machine learning model from an edge device corresponding to a user, wherein the request includes attributes of the edge device and characteristics of the user of the edge device;
determine the specific edge device and user combination based on the attributes of the edge device and the characteristics of the user of the edge device included in the request;
select the machine learning model from among the number of machine learning models that is best suited for the specific edge device and user combination according to a set of model distribution policies;
sign the machine learning model securely to enable the edge device to know that the machine learning model is from a trusted source;
download the machine learning model to the edge device; and wherein the number of processors further execute program instructions, each time the edge device connects with the server, to:
update a device profile according to new data received from the edge device in response to the edge device performing an artificial intelligence function using the machine learning model downloaded to the edge device;
compare the device profile to the set of model distribution policies;
determine whether a new machine learning model is better suited for the edge device based on comparing the device profile to the set of model distribution policies; and
download the new machine learning model to the edge device in response to determining that the new machine learning model is better suited for the edge device.

7. The system of claim 6, wherein the server uses AB testing to determine the machine learning model best suited to run on the edge device.

8. The system of claim 6, wherein the set of model distribution policies match each respective machine learning model of the number of machine learning models to specific edge device attributes and user characteristics.

9. The system of claim 6, wherein the number of processors further execute program instructions to:
receive performance data corresponding to the machine learning model downloaded to the edge device; and
update the set of model distribution policies and model accuracy according to the performance data.

10. The system of claim 9, wherein the number of processors further execute program instructions to:
retune the machine learning model stored on the server according to the performance data.

11. A computer program product for distributing machine learning models to edge devices, the computer program product comprising a computer readable storage medium having program instructions embodied therewith, the program instructions executable by a server to cause the server to perform a method of:
building, by the server, a number of machine learning models and storing the number of machine learning models on the server, wherein the server customizes each respective machine learning model to a specific edge device and user combination;
receiving, by the server, a request for a machine learning model from an edge device corresponding to a user, wherein the request includes attributes of the edge device and characteristics of the user of the edge device;
determining, by the server, the specific edge device and user combination based on the attributes of the edge device and the characteristics of the user of the edge device included in the request;
selecting, by the server, the machine learning model from among the number of machine learning models that is best suited for the specific edge device and user combination according to a set of model distribution policies;
signing, by the server, the machine learning model securely to enable the edge device to know that the machine learning model is from a trusted source;
downloading, by the server, the machine learning model to the edge device; and further comprising, each time the edge device connects with the server, instructions for:
updating, by the server, a device profile according to new data received from the edge device in response to the edge device performing an artificial intelligence function using the machine learning model downloaded to the edge device;
comparing, by the server, the device profile to the set of model distribution policies;
determining, by the server, whether a new machine learning model is better suited for the edge device based on comparing the device profile to the set of model distribution policies; and
responsive to the server determining that a new machine learning model is better suited for the edge device based on comparing the device profile to the set of model distribution policies, downloading, by the server, the new machine learning model to the edge device.

12. The computer program product of claim 11, wherein the server uses A/B testing to determine the machine learning model best suited to run on the edge device.

13. The computer program product of claim 11, wherein the set of model distribution policies match each respective machine learning model of the number of machine learning models to specific edge device attributes and user characteristics.

14. The computer program product of claim 11, further comprising instructions for:
receiving, by the server, performance data corresponding to the machine learning model downloaded to the edge device; and
updating, by the server, the set of model distribution policies and model accuracy according to the performance data.

15. The computer program product of claim 14, further comprising instructions for:
retuning, by the server, the machine learning model stored on the server according to the performance data.

* * * * *